(12) United States Patent
McCoy et al.

(10) Patent No.: US 7,912,083 B2
(45) Date of Patent: Mar. 22, 2011

(54) TECHNIQUES FOR REDUCING A CELL IDENTIFICATION FALSING RATE IN A WIRELESS COMMUNICATION SYSTEM

(75) Inventors: James W. McCoy, Austin, TX (US); Taeyoon Kim, Austin, TX (US); Liying Song, Auburn, AL (US)

(73) Assignee: Freescale Semiconductor, Inc., Austin, TX (US)

( * ) Notice: Subject to any disclaimer, the term of this patent is extended or adjusted under 35 U.S.C. 154(b) by 756 days.

(21) Appl. No.: 11/865,341

(22) Filed: Oct. 1, 2007

(65) Prior Publication Data

US 2009/0086669 A1   Apr. 2, 2009

(51) Int. Cl.
*H04J 3/00* (2006.01)
(52) U.S. Cl. ...................................................... 370/464
(58) Field of Classification Search ................... None
See application file for complete search history.

(56) References Cited

U.S. PATENT DOCUMENTS

| | | | |
|---|---|---|---|
| 6,847,630 B2 | 1/2005 | Blanz et al. | |
| 7,620,115 B2 * | 11/2009 | Kim et al. | 375/267 |
| 7,706,249 B2 * | 4/2010 | Akita et al. | 370/208 |
| 2003/0009595 A1 * | 1/2003 | Collins | 709/247 |
| 2004/0085946 A1 | 5/2004 | Morita et al. | |
| 2005/0078654 A1 | 4/2005 | Rick et al. | |
| 2006/0039343 A1 * | 2/2006 | Anderson et al. | 370/342 |
| 2007/0093253 A1 | 4/2007 | Lindoff et al. | |
| 2007/0140106 A1 | 6/2007 | Tsai et al. | |
| 2008/0080439 A1 * | 4/2008 | Aziz et al. | 370/338 |
| 2008/0291892 A1 * | 11/2008 | Luo | 370/350 |

FOREIGN PATENT DOCUMENTS
WO    WO 0065736    11/2000

OTHER PUBLICATIONS

3GPP TS 36.211 V8.0.0, "3rd Generation Partnership Project; Technical Specification Group Radio Access Network; Evolved Universal Terrestrial Radio Access (E-Utra); Physical channels and modulation (Release 8)", Sep. 2007.
International Search Report for coordinating PCT Application No. PCT/US2008/075574 mailed Mar. 18, 2009.

(Continued)

*Primary Examiner* — Chi H Pham
*Assistant Examiner* — Fan Ng
(74) *Attorney, Agent, or Firm* — Dillon & Yudell LLP

(57) ABSTRACT

A technique of operating a wireless communication device includes selecting, from a primary sequence group that includes respective primary sequences, one of the respective primary sequences as a first portion of a cell identification (ID). In this case, the respective primary sequences are each associated with respective secondary sequence subgroups included in a secondary sequence group. Each of the respective secondary sequence subgroups include secondary sequences. One of the secondary sequences is selected (from one of the respective secondary sequence subgroups that is associated with the selected one of the respective primary sequences) for a second portion of the cell ID. At least some of the secondary sequences are only included in one of the respective secondary sequence subgroups. The first portion of the cell ID is encoded on a first downlink waveform that is to be transmitted and the second portion of the cell ID is encoded on a second downlink waveform that is to be transmitted. The first and second downlink waveforms are then transmitted.

20 Claims, 6 Drawing Sheets

OTHER PUBLICATIONS

Source: NTT DOCOMO; "Physical Channel Condept for Scalable Bandwidth in Evolved UTRA Downlink"; 3GPP TSG RAN WG1 Ad Hoc on LTE; Jun. 20-21, 2005; pp. 1-14; Sophia Antipolis, France.

Source: Motorola; "Cell Search and Initial Acquisition for OFDM Downlink"; 3GPP TSG RAN1#43; Nov. 7-11, 2005; pp. 1-7; Seoul, Korea.

Source: NTT DOCOMO, NEC, Sharp; "SCH Structure and Cell Search Method in E-UTRA Downlink"; 3GPP TSG-RAN WG1 LTE Ad Hoc Meeting; Jan. 23-25, 2006; pp. 1-9; Helsinki, Finland.

Source: NTT DOCOMO, KDDI, Mitsubishi Electric, Sharp; "Scrambling Method for S-SCH in E-UTRA Downlink"; 3GPP TSG RAN WG1 Meedting #49bis; Jun. 25-29, 2007; pp. 1-4; Orlando, Florida, USA.

* cited by examiner

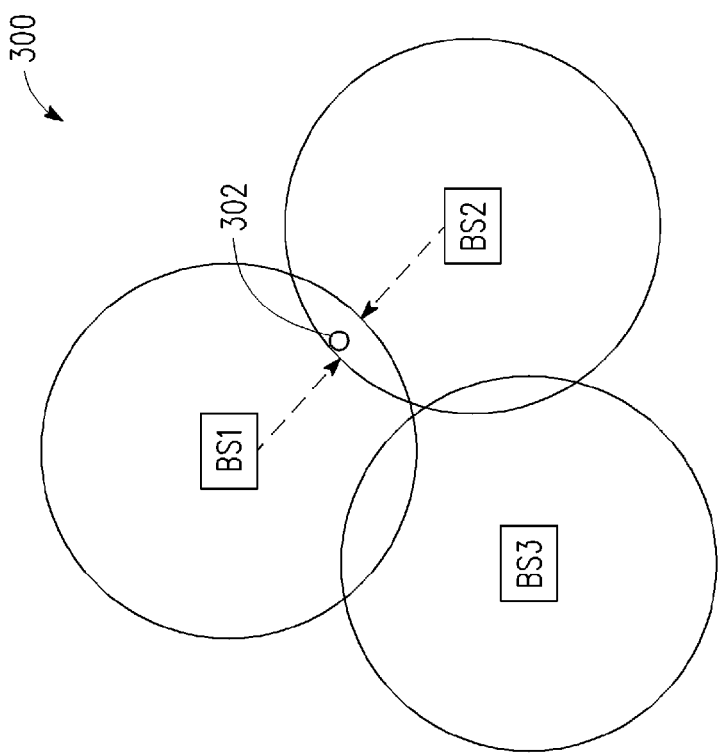
FIG. 3
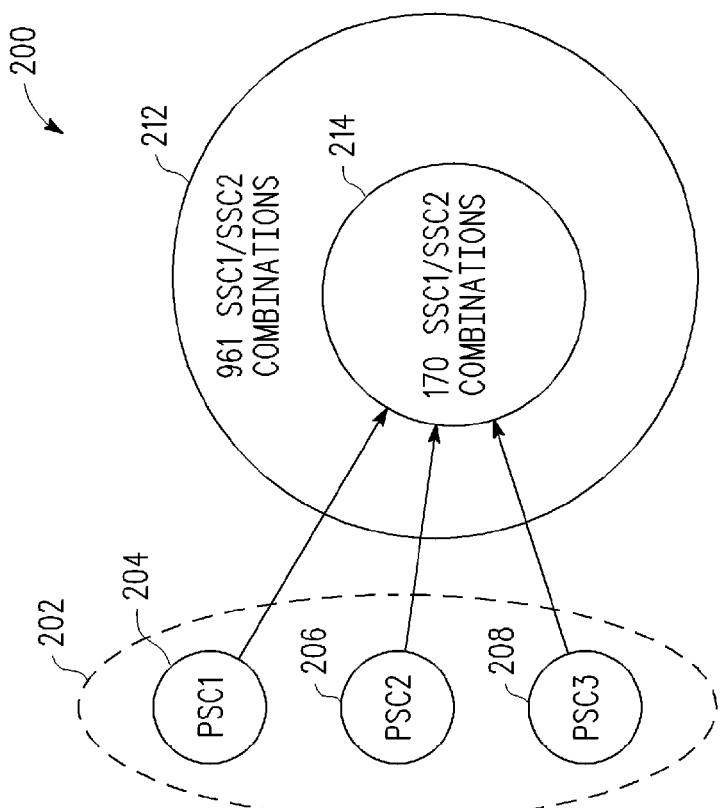
FIG. 2 —PRIOR ART—

US 7,912,083 B2

TECHNIQUES FOR REDUCING A CELL IDENTIFICATION FALSING RATE IN A WIRELESS COMMUNICATION SYSTEM

BACKGROUND

1. Field

This disclosure relates generally to a wireless communication system and, more specifically, to techniques for reducing a cell identification falsing rate in a wireless communication system.

2. Related Art

In general, orthogonal frequency division multiplexing (OFDM) systems support high data rate wireless transmission using orthogonal channels. Typically, OFDM systems split data into N streams, which are independently modulated on parallel spaced subcarrier frequencies or tones. The frequency separation between subcarriers is 1/T, where T is the OFDM symbol time duration. Each symbol may include a guard interval (or cyclic prefix) to maintain the orthogonality of the symbols. OFDM systems have usually utilized an inverse discrete Fourier transform (IDFT) to generate a sampled (or discrete) composite time-domain signal for transmission.

Each base station (BS) in a wireless communication system has typically been designed to signal a unique cell identification (ID) in a transmitted downlink signal. Upon receipt of one or more downlink signals, a cell ID has been acquired by a subscriber station (SS) to uniquely identify a BS to which the SS has desired to communicate. For example, with reference to FIG. 1, a relevant portion of a downlink radio frame 100, provided by a third-generation partnership project-long term evolution (3GPP-LTE) compliant BS, is illustrated. As currently specified, a 3GPP-LTE compliant BS provides an associated cell ID in a hierarchical manner over a combination of downlink waveforms provided on a primary synchronization channel (P-SCH), at symbol 6 of slots 0 and 10 of each 10 millisecond radio frame, and a secondary synchronization channel (S-SCH), at symbol 5 of slots 0 and 10 of each 10 millisecond radio frame. As currently specified, the P-SCH and the S-SCH occupy seventy-two subcarriers (some of which are not utilized) centered around a DC subcarrier. Waveforms may be encoded on the P-SCH using generalized chirp like (GCL) sequences and on the S-SCH using binary sequences. In one proposed scheme, the S-SCH sequence has included a combination of two secondary short codes, i.e., a first secondary short code (SSC1) and a second secondary short code (SSC2). According to this scheme, three P-SCH sequences are employed to reduce the number of sequences an SS is required to search to acquire coarse timing and frequency alignment. An acquired P-SCH sequence has then been used by the SS for coherent detection of an S-SCH. The combination of the detected P-SCH and the detected S-SCH have then been decoded to provide a cell ID.

With reference to FIG. 2, a diagram 200 depicts a proposed cell ID assignment scheme for 3GPP-LTE that employs a secondary sequence group 212 that includes thirty-one SSC1s and thirty-one SSC2s to provide nine hundred sixty-one (31*31=961) total SSC1/SSC2 combinations. In this scheme, a subset 214 of one-hundred seventy of the SSC1/SSC2 combinations has been selected from the nine-hundred sixty-one total SSC1/SSC2 combinations and each of three P-SCH sequences 204, 206, and 208 (included in primary sequence group 202) has been associated with the subset 214 of one-hundred seventy SSC1/SSC2 combinations to provide a total of five-hundred ten (170*3=510) possible cell IDs. With reference to FIG. 3, a diagram 300 illustrates an SS 302 that may receive P-SCH sequences and SSC1/SSC2 combinations from multiple base stations (e.g., BS1, BS2, and BS3). As each of the P-SCH sequences is associated with the same subset of one-hundred seventy SSC1/SSC2 combinations, it is possible that the SS 302 (which may be a cell-edge SS) may detect the P-SCH from one BS (e.g., BS1) and the S-SCH from another BS (e.g., BS2), which may result in a false cell ID being detected by the SS 302. When an SS detects a false cell ID, it is unlikely that a communication link between the SS and a BS (associated with the false cell ID) will be successfully established.

In an attempt to randomize interference between neighboring cells and reduce the cell ID falsing rate (i.e., the possibility of an SS detecting an incorrect cell ID), one known scheme has proposed assigning a different scrambling code to each of three P-SCH sequences. In this case, an appropriate one of the scrambling codes (dependent upon the P-SCH sequence) is utilized to scramble the S-SCH sequence transmitted by a given BS. Similarly, another scheme has proposed scrambling each SSC2 sequence based on an associated SSC1 sequence to reduced the probability of an SS detecting an incorrect cell ID. While the use of scrambling codes normally reduces the possibility of an SS detecting a false cell ID, a cell ID falsing rate may still be less than desirable for many applications.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 2 is an example diagram of a conventional approach for encoding cell identifications (IDs).

FIG. 3 is an example diagram of a subscriber station (SS) in a wireless communication system that is attempting to establish a communication link with a BS.

DETAILED DESCRIPTION

In the following detailed description, specific exemplary embodiments in which the invention may be practiced are described in sufficient detail to enable those of ordinary skill in the art to practice the invention. It should be appreciated that other embodiments may be utilized and that logical, architectural, programmatic, mechanical, electrical, and other changes may be made to the disclosed embodiments without departing from the spirit or scope of the present invention. The following detailed description is, therefore, not to be taken in a limiting sense, and the scope of the present invention is defined only by the appended claims and their equivalents. In particular, although the preferred embodiment is described below in conjunction with a base station and subscriber station, such as a cellular handset, it will be appreciated that the present invention is not so limited and various aspects of the present disclosure may be embodied in various devices, e.g., personal digital assistants (PDAs), digital cameras, portable storage devices, audio players, computer systems, and portable gaming devices, for example.

As is used herein, the term "subscriber station" is synonymous with the term "user equipment" and is used to broadly denote a wireless communication device associated with a wireless communication system. As is also used herein, the term "channel" includes one or more symbols, which may occupy an entire system bandwidth or a portion of the entire system bandwidth (i.e., a channel includes one or more subcarriers, which may or may not be adjacent). As may be used herein, the term "slot" refers to a symbol location in a multiple access signal. Transmitters implemented within a wireless communication system, configured according to various embodiments of the present disclosure, may transmit information using a phase shift keying (PSK), a quadrature amplitude modulation (QAM), or other data modulation scheme. For example, any of the various PSK (such as pi/2 BPSK, QPSK, and 8-PSK), or QAM (such as 16-QAM and 64-QAM) modulation techniques may be implemented. According to various aspects of the present disclosure, cell identification (ID) encoding/decoding techniques are employed in a wireless communication system to generally reduce a cell ID falsing rate (i.e., the probability of a subscriber station (SS) detecting an incorrect cell ID).

Figure 8:
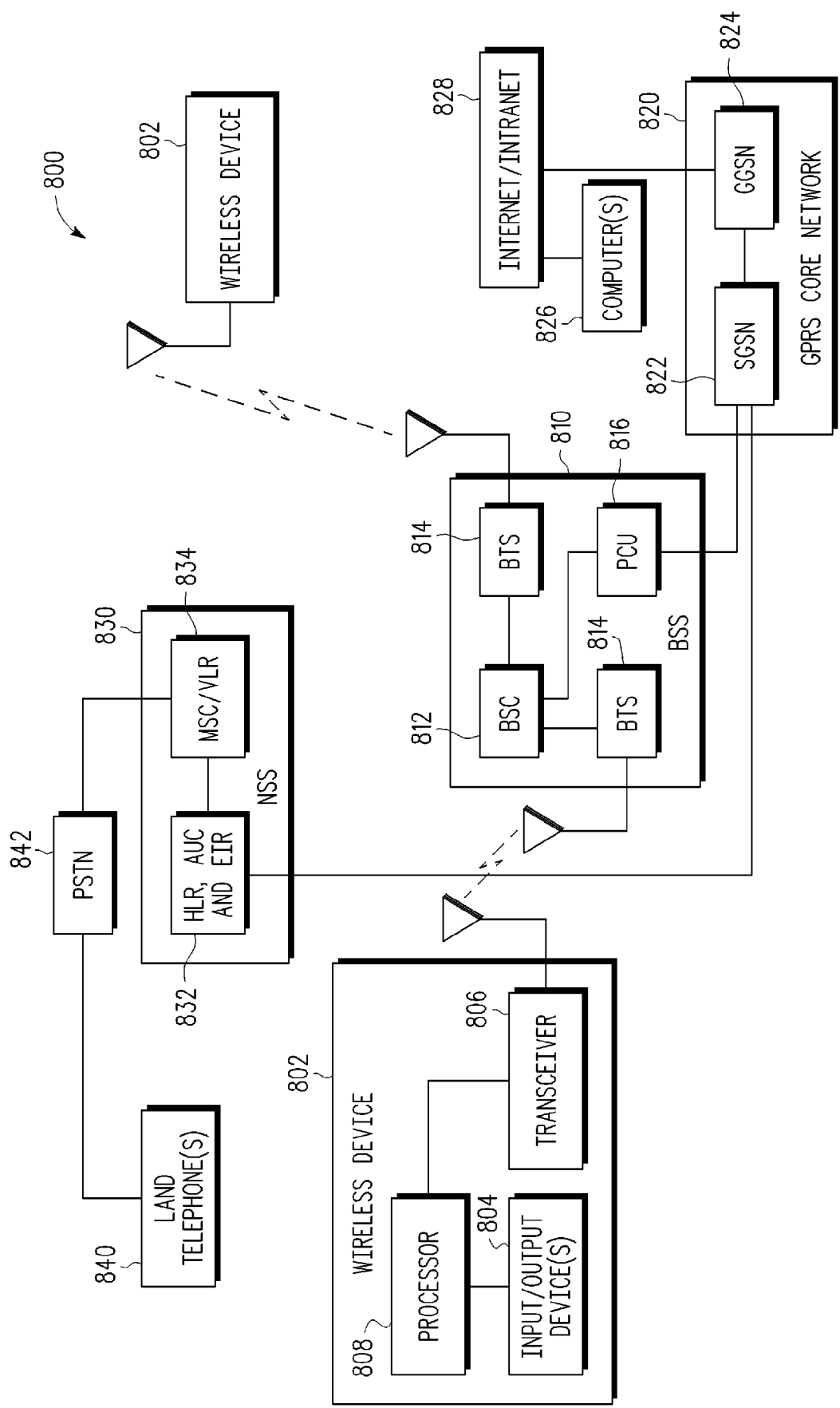
FIG. 8 is a block diagram of an example wireless communication system whose respective devices may be configured to encode/decode cell IDs according to various embodiments of the present disclosure.

In a typical wireless communication system configured according to one or more embodiments of the present disclosure, a scheduler associated with one or more BSs (e.g., a network scheduler (included in base station controller (BSC) 812 of FIG. 8) or a scheduler located at a base transceiver station (BTS) 814 of FIG. 8) is configured to assign cell IDs to the one or more BSs. The scheduler may also be configured to schedule a control channel format indicator (CCFI) in a downlink shared control channel (physical downlink control channel (PDCCH)) to indicate a size, e.g., in symbols, of the downlink shared control channel. For example, in a wireless communication system that may transmit up to three symbols in a downlink shared control channel, the CCFI may include two bits that are repeated twelve times in a first symbol of the downlink shared control channel in a protocol dependent location. The control channel symbols may be, for example, orthogonal frequency multiplexing (OFDM) signals. An associated control channel of an SS (included in the downlink shared control channel) may include one or more control channel elements (CEs) that provide various control information to the SS.

According to various aspects of the present disclosure, a technique for operating a wireless communication device includes selecting, from a primary sequence group that includes respective primary sequences, one of the respective primary sequences as a first portion of a cell identification (ID). In this case, the respective primary sequences are each associated with respective secondary sequence subgroups included in a secondary sequence group. Each of the respective secondary sequence subgroups include secondary sequences at least some of which are only included in one of the respective secondary sequence subgroups. One of the secondary sequences is selected (from one of the respective secondary sequence subgroups that is associated with the selected one of the respective primary sequences) for a second portion of the cell ID. The first portion of the cell ID is encoded on a first downlink waveform that is to be transmitted and the second portion of the cell ID is encoded on a second downlink waveform that is to be transmitted. The first and second downlink waveforms are then transmitted. It should be appreciated that transmitting a cell ID in a hierarchical manner generally reduces the complexity of a receiver as the number of correlators for coarse signal acquisition may be reduced. For example, in a wireless communication system that employs three primary sequences, three parallel correlators may be employed to detect the first portion of the cell ID.

According to other aspects of the present disclosure, a technique for operating a wireless communication device includes receiving first and second downlink waveforms. A first portion of a cell identification provided in the first downlink waveform is decoded. The first portion of the cell identification is based on a selected primary sequence included in a primary sequence group having respective primary sequences, including the selected primary sequence. The respective primary sequences are each associated with respective secondary sequence subgroups included in a secondary sequence group and each of the respective secondary sequence subgroups include secondary sequences at least some of which are only included in one of the respective secondary sequence subgroups. A second portion of a cell identification provided in the second downlink waveform is decoded. The second portion of the cell identification is based on a selected one of the secondary sequences selected from one of the respective secondary sequence subgroups associated with the selected primary sequence.

According to another aspect of the present disclosure, a wireless communication device includes a receiver and a processor. The receiver is configured to receive first and second downlink waveforms and is coupled to the processor. The processor is configured to decode a first portion of a cell identification provided in the first downlink waveform. The first portion of the cell identification is based on a selected primary sequence included in a primary sequence group having respective primary sequences, including the selected primary sequence. The respective primary sequences are each associated with respective secondary sequence subgroups included in a secondary sequence group and each of the respective secondary sequence subgroups include secondary sequences at least some of which are only included in one of the respective secondary sequence subgroups. The processor is also configured to decode a second portion of a cell identification provided in the second downlink waveform, wherein the second portion of the cell identification is based on a selected one of the secondary sequences selected from one of the respective secondary sequence subgroups associated with the selected primary sequence.

Figure 1:
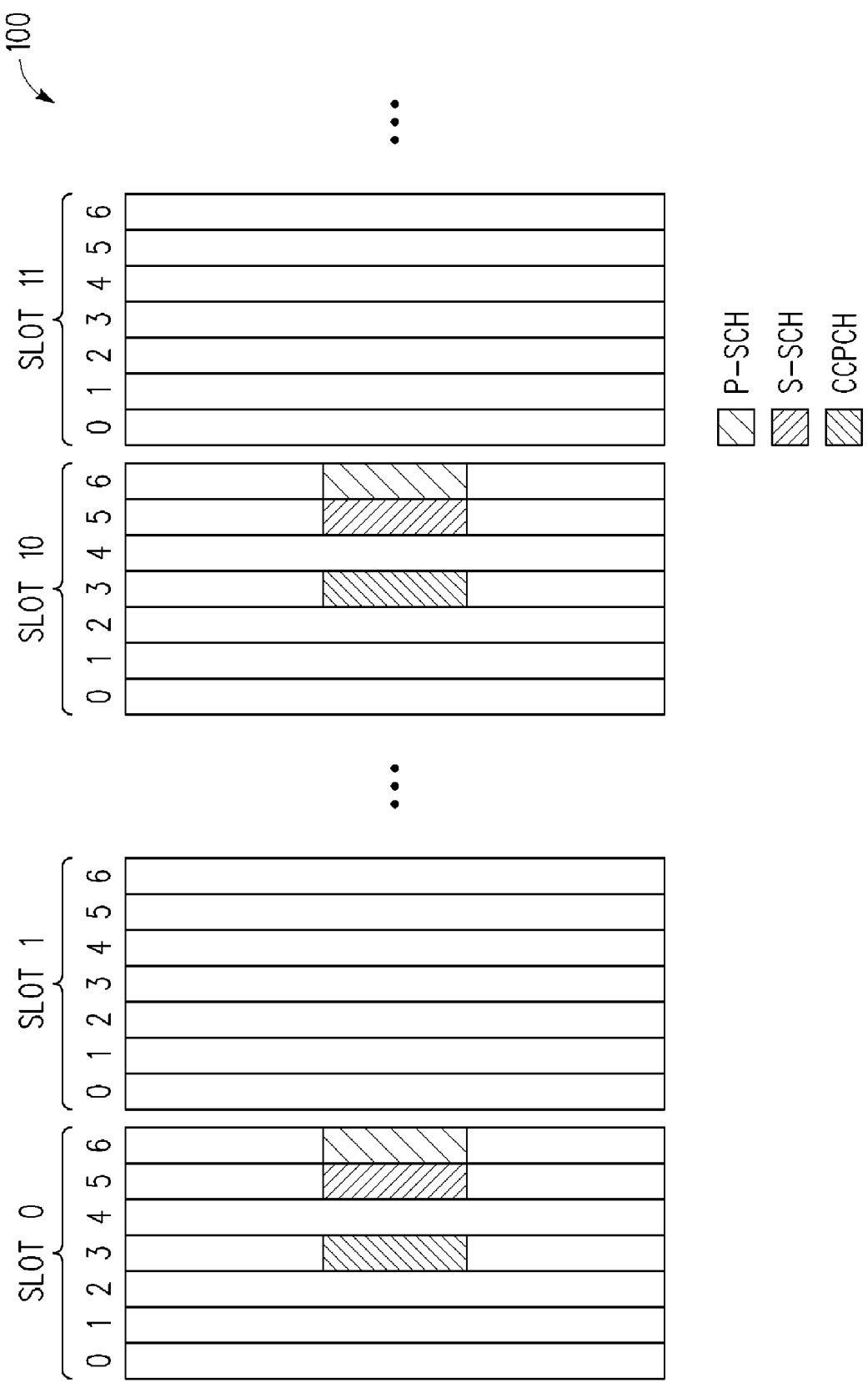
FIG. 1 is an example diagram of a relevant portion of a downlink radio frame provided by a third-generation partnership project-long term evolution (3GPP-LTE) compliant base station (BS).
Figure 4:
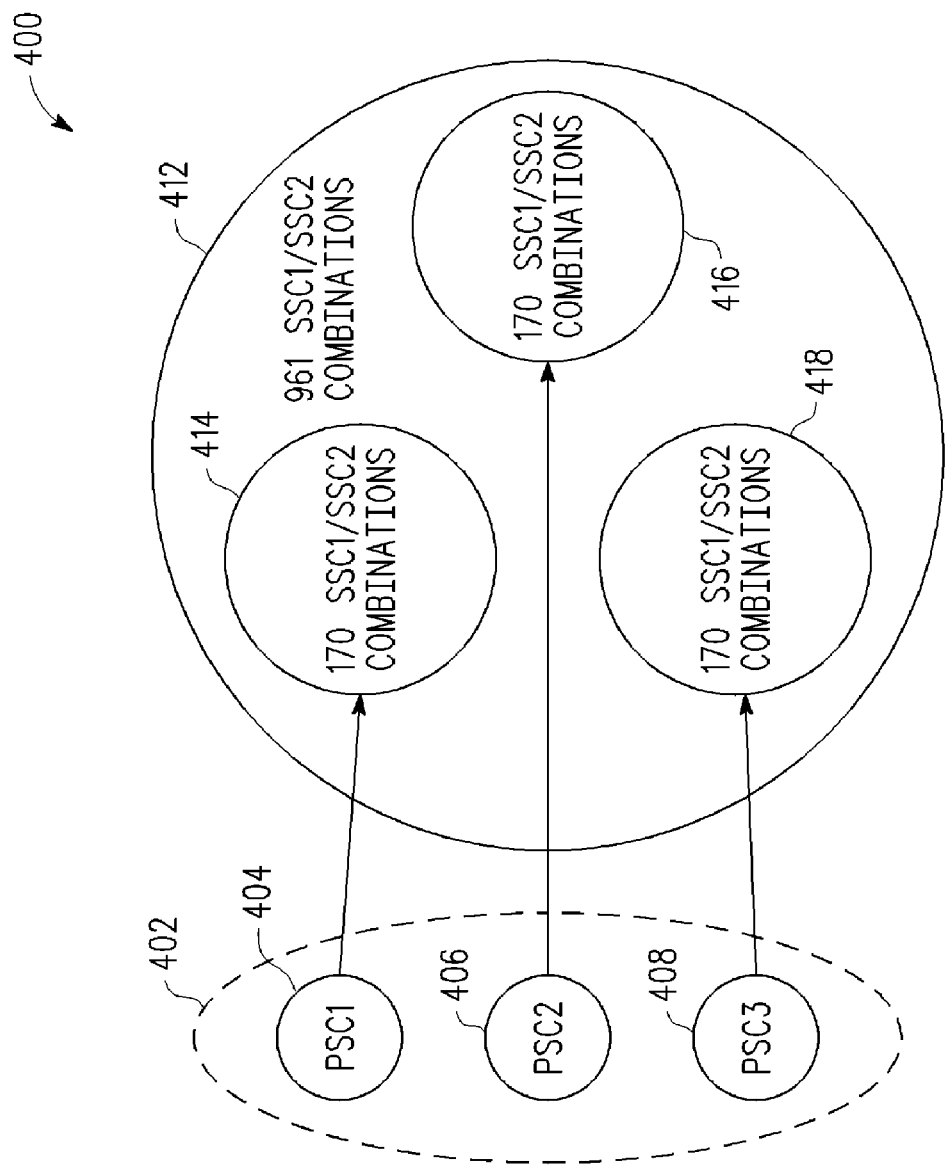
FIG. 4 is an example diagram of a technique for encoding cell IDs, according to one aspect of the present disclosure.

With reference to FIG. 4, an example diagram 400 of a hierarchical technique for encoding cell IDs, according to one aspect of the present disclosure, is illustrated. As is depicted in FIG. 4, a primary sequence group 402 includes three primary sequences 404, 406, and 408, e.g., GCL sequences. In various embodiments, one of the primary sequences 404-408 is selected to provide a first portion of a cell ID that is transmitted on a downlink waveform over a primary synchronization channel (P-SCH). According to various aspects of the present disclosure, each of the primary sequences 404-406 is associated with a different secondary sequence subgroup that is included within a secondary sequence group 412. As is shown, the primary sequence 404 is associated with secondary sequence subgroup 414, the primary sequence 406 is associated with secondary sequence subgroup 416, and the primary sequence 408 is associated with secondary sequence subgroup 418. Each of the secondary sequence subgroups 414-418 includes multiple secondary sequences, e.g., binary sequences, that each correspond to an SSC1/SSC2 combination. In this case, SSC1 is transmitted on a first subchannel of a secondary synchronization channel (S-SCH) and SSC2 is transmitted on a second subchannel of the secondary synchronization channel.

In one embodiment, each of the secondary sequence subgroups 414-418 includes a different subset of one-hundred seventy sequences that are included within nine-hundred sixty-one possible SSC1/SSC2 combinations, which may derived from thirty-one SSC1 sequences and thirty-one SSC2 sequences (i.e., 31*31=961). It should be appreciated that the techniques disclosed herein are broadly applicable to wireless communication systems that employ two or more primary sequences and two or more secondary sequence subgroups each including two or more secondary sequences. In various embodiments, one of the secondary sequences is selected (from the secondary sequence subgroup that is associated with the selected primary sequence) to provide a second portion of a cell ID that is transmitted on a downlink waveform over a secondary synchronization channel (S-SCH) that utilizes the two short codes SSC1/SSC2. In another embodiment, multiple of the secondary sequence subgroups 414-418 have partial overlap in secondary sequences. In this case, it is possible that a given secondary sequence may correspond to more than one primary sequence.

In general, the hierarchical scheme (P-SCH/S-SCH) simplifies receiver design in that coarse signal acquisition may be performed on a smaller set of sequences (i.e., the possible sequences provided on the P-SCH). For example, coarse timing and frequency alignment may be performed using the P-SCH. In this manner, a detected P-SCH may then be used as a coherent reference for detecting the S-SCH. Providing a different subgroup of secondary sequences for each primary sequence maintains orthogonality between the secondary sequences (combinations of SSC1/SSC2) and, thus, lowers the probability that a given SS will detect an incorrect cell ID, as none of the secondary sequences are the same. In general, the sequences for the P-SCH and the S-SCH may be selected to have a zero auto-correlation property.

Figure 5:
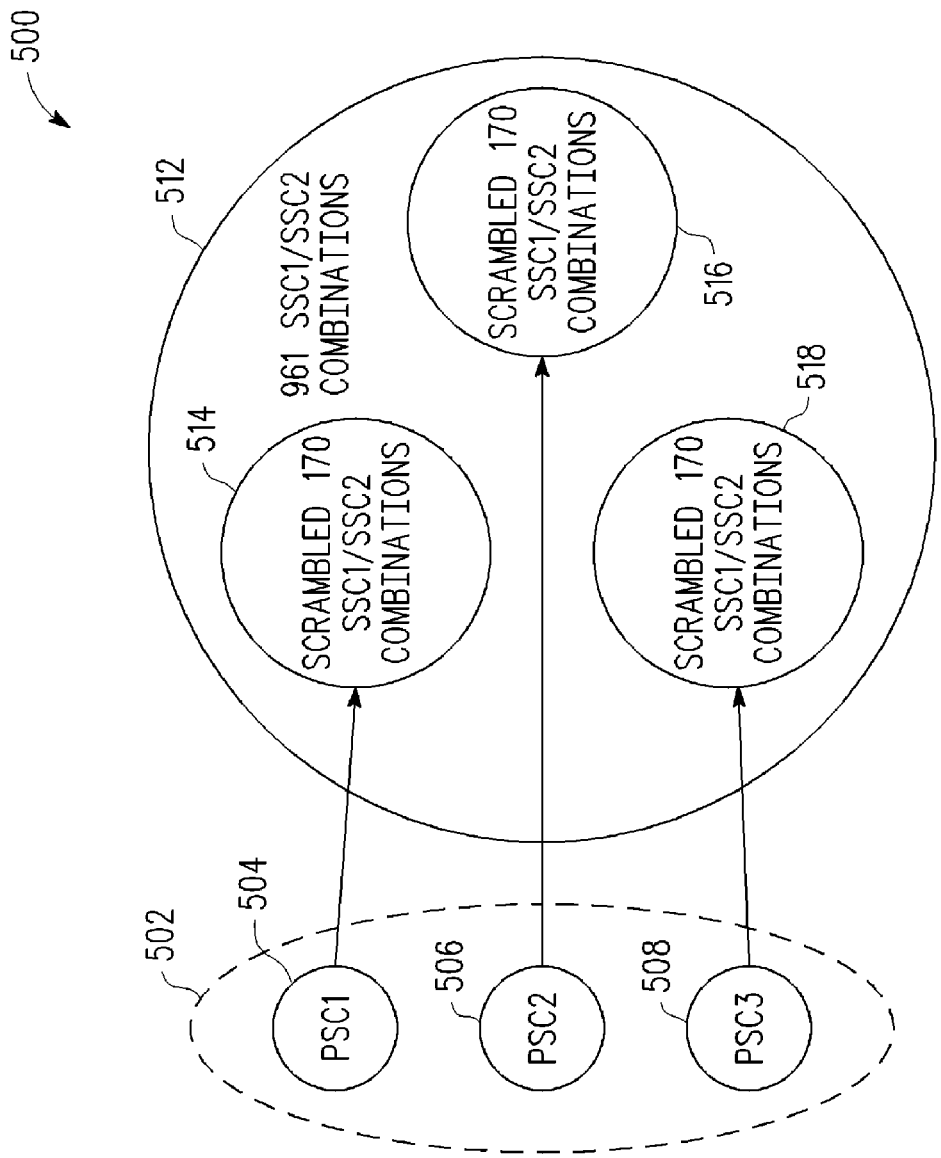
FIG. 5 is an example diagram of a technique for encoding cell IDs, according to another aspect of the present disclosure.

With reference to FIG. 5, an example diagram 500 of another hierarchical technique for encoding cell IDs, according to one aspect of the present disclosure, is illustrated. The technique diagramed in FIG. 5 is similar to the technique diagramed in FIG. 4, with the exception that scrambling is employed in FIG. 5. As is depicted in FIG. 5, a primary sequence group 402 includes three primary sequences, 404, 406, and 408. As noted above, one of the primary sequences 404-408 is selected to provide a first portion of a cell ID that is transmitted on a downlink waveform over a primary synchronization channel (P-SCH). According to various aspects of the present disclosure, each of the primary sequences 404-406 is associated with a different secondary sequence subgroup that is included within a secondary sequence group 512. As is shown, the primary sequence 404 is associated with a scrambled secondary sequence subgroup 514, the primary sequence 406 is associated with a scrambled secondary sequence subgroup 516, and the primary sequence 408 is associated with a scrambled secondary sequence subgroup 518. Each of the scrambled secondary sequence subgroups 514-518 includes multiple scrambled secondary sequences that each correspond to a scrambled SSC1/SSC2 combination. The scrambling may be performed in various manners. For example, a primary sequence may be used to scramble an associated one the SSC1/SSC2 combinations or an SSC1 may be used to scramble an SSC2. In general, scrambling reduces the probability that a wrong cell ID will be detected by a given SS. In another embodiment, multiple of the scrambled secondary sequence subgroups 514-518 have partial overlap in secondary sequences. In this case, it is possible that a given secondary sequence may correspond to more than one primary sequence.

Figure 6:
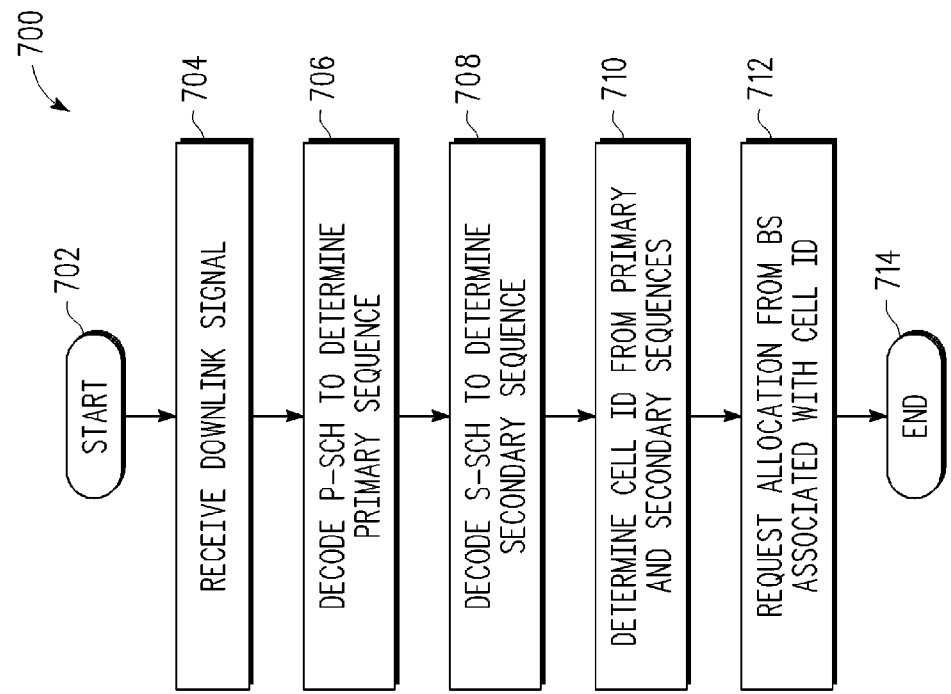
FIG. 6 is a flowchart of an example process for encoding cell IDs, according to one aspect of the present disclosure.

Moving to FIG. 6, an example process 600 for encoding a cell identification (ID), according to one or more embodiments of the present disclosure, is illustrated. The process 600 is initiated in block 602 at which point control transfers to block 604. In block 604 a primary sequence is selected from a primary sequence group. As noted above, the primary sequence corresponds to a first portion of a cell ID that is encoded on a waveform transmitted over a P-SCH. Next, in block 606, a secondary sequence is selected from a secondary sequence subgroup that is associated with the selected primary sequence. As noted above, the secondary sequence corresponds to a second portion of a cell ID that is encoded on a waveform transmitted over a S-SCH. The cell ID for a given BS may be selected by a scheduler. Alternatively, a given BS may select a cell ID from a look-up table of available cell IDs. In either case, in block 608, the BS encodes a first portion of the cell ID on a first downlink waveform that is to be transmitted using the selected primary sequence. Next, in block 610, a second portion of the cell ID is encoded on a second downlink waveform that is to be transmitted using the selected secondary sequence. Then, in block 612, the BS transmits the first and second downlink waveforms in a downlink signal. From block 612, control transfers to block 614 where the process 600 terminates.

Figure 7:
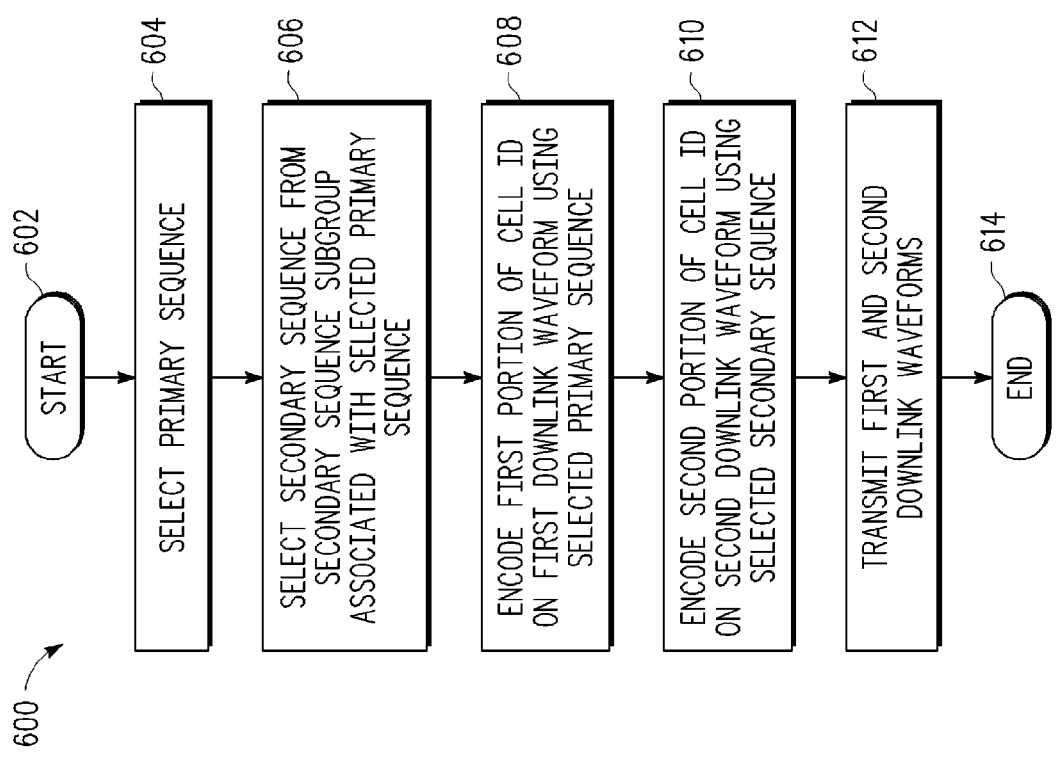
FIG. 7 is a flowchart of an example process for decoding cell IDs, according to another aspect of the present disclosure.

Turning to FIG. 7, an example process 700 for decoding a cell identification (ID) at an SS, according to one or more embodiments of the present disclosure, is illustrated. The process 700 is initiated in block 702 at which point control transfers to block 704. In block 704 a downlink signal is received. Next, in block 706, an SS decodes a P-SCH to determine a primary sequence. For example, the SS may employ three parallel correlators (each of which is associated with one of three primary sequences) that provide a detect signal when an associated primary sequence is detected. The SS then frequency and time aligns the received signal, based on the detected primary sequence. The SS may, for example, analyze a signal quality (e.g., signal level) associated with multiple primary sequences, when multiple primary sequences are received at an SS, to determine a best BS to establish communications. Next, in block 708, the SS decodes the S-SCH to determine a secondary sequence. In a system that employees three primary sequences and one-hundred seventy secondary sequences, five-hundred ten (510=170×3) cell IDs may be encoded. As noted above, a cell ID is given by the combination of the waveforms on the P-SCH and the S-SCH. Next, in block 710, the SS determines the cell ID from the primary and secondary sequences (i.e., the waveforms on the P-SCH and S-SCH). Then, in block 712, the SS requests an allocation from the BS that is associated with the cell ID. From block 712, control transfers to block 714 where the process 700 terminates.

With reference to FIG. 8, an example wireless communication system 800 is depicted that includes a plurality of wireless devices (subscriber stations) 802, e.g., hand-held computers, personal digital assistants (PDAs), cellular telephones, etc., that may be configured to decode cell IDs according to the present disclosure. In general, the wireless devices 802 include a processor 808 (e.g., a digital signal processor (DSP)) that employs a software system, a transceiver (including a receiver and a transmitter) 806, and one or more input/output devices 804 (e.g., a camera, a keypad, display, etc.), among other components not shown in FIG. 8.

As is noted above, according to various embodiments of the present disclosure, the disclosed cell ID encoding/decoding techniques generally reduce a cell ID falsing rate for a wireless communication device, such as the wireless devices 802. The wireless devices 802 communicate with a base station controller (BSC) 812 of a base station subsystem (BSS) 810, via one or more base transceiver stations (BTS) (or base stations (BSs)) 814, to receive or transmit voice, data, video, or voice, data, and video. In a typical implementation, each of the BSs 814 is assigned one cell ID (i.e., each BS 814 corresponds to one cell). The BSC 812 may, for example, be configured to schedule communications for the wireless devices 802. Alternatively, the BTS 814 may schedule communications for the wireless devices 802 in which the BTS 814 is in communication. In either case, a scheduler typically employs one or more processors (that execute a software system) to schedule communications.

In the example wireless communication system 100, the BSC 812 is also in communication with a packet control unit (PCU) 816, which is in communication with a serving general packet radio service (GPRS) support node (SGSN) 822. The SGSN 822 is in communication with a gateway GPRS support node (GGSN) 824, both of which are included within a GPRS core network 820. The GGSN 824 provides access to computer(s) 826 coupled to Internet/intranet 828. In this manner, the wireless devices 802 may receive data from and/or transmit data to computers coupled to the Internet/intranet 828. For example, when the devices 802 include a camera, images may be transferred to a computer 826 coupled to the Internet/intranet 828 or to another one of the devices 802. The BSC 812 is also in communication with a mobile switching center/visitor location register (MSC/VLR) 834, which is in communication with a home location register (HLR), an authentication center (AUC), and an equipment identity register (EIR) 832. In a typical implementation, the MSC/VLR 834 and the HLR, AUC, and EIR 832 are located within a network and switching subsystem (NSS) 830, which may also perform scheduling for the system 800. The SGSN 822 may communicate directly with the BLR, AUC and EIR 832. As is also shown, the MSC/VLR 834 is in communication with a public switched telephone network (PSTN) 842, which facilitates communication between wireless devices 802 and land telephones 840. It should be appreciated that other types of wireless systems, having different configurations, may implement various aspects of the cell ID encoding/decoding disclosed herein.

Accordingly, a number of techniques have been disclosed herein that generally reduce a cell identification falsing rate in a wireless communication system.

As used herein, a software system can include one or more objects, agents, threads, subroutines, separate software applications, two or more lines of code or other suitable software structures operating in one or more separate software applications, on one or more different processors, or other suitable software architectures.

As will be appreciated, the processes in preferred embodiments of the present invention may be implemented using a combination of software, firmware, or hardware. For example, software that implements the cell ID selection process may be stored at a scheduler or at a BS. As a preparatory step to practicing the invention in software, the computer programming code (whether software or firmware) according to a preferred embodiment will typically be stored in one or more machine readable storage mediums such as fixed (hard) drives, diskettes, optical disks, magnetic tape, semiconductor memories such as read-only memories (ROMs), programmable ROMs (PROMs), etc., thereby making an article of manufacture in accordance with the invention. The article of manufacture containing the computer programming code is used by either executing the code directly from the storage device, by copying the code from the storage device into another storage device such as a hard disk, random access memory (RAM), etc., or by transmitting the code for remote execution. The method form of the invention may be practiced by combining one or more machine-readable storage devices containing the code according to the present disclosure with appropriate standard computer hardware to execute the code contained therein. An apparatus for practicing the techniques of the present disclosure could be one or more computers and storage systems containing or having network access to computer program(s) coded in accordance with the present disclosure.

Although the invention is described herein with reference to specific embodiments, various modifications and changes can be made without departing from the scope of the present invention as set forth in the claims below. For example, the cell ID encoding/decoding techniques disclosed herein are generally broadly applicable to wireless communication systems. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of operating a wireless communication device, comprising:
    encoding a first portion of a cell identification that is to be transmitted on a first downlink waveform, wherein the first portion of the cell identification is based on a selected primary sequence included in a primary sequence group having respective primary sequences, including the selected primary sequence, and wherein the respective primary sequences are each associated with respective secondary sequence subgroups included in a secondary sequence group and each of the respective secondary sequence subgroups include secondary sequences at least some of which are only included in one of the respective secondary sequence subgroups;
    encoding a second portion of a cell identification that is to be transmitted on a second downlink waveform, wherein the second portion of the cell identification is based on a selected one of the secondary sequences selected from one of the respective secondary sequence subgroups associated with the selected primary sequence; and
    transmitting the first and second downlink waveforms.

2. The method of claim 1, wherein the transmitting the first and second downlink waveforms further comprises:
    transmitting the first downlink waveform on a primary synchronization channel; and
    transmitting the second downlink waveform on a secondary synchronization channel.

3. The method of claim 2, wherein the transmitting the second downlink waveform on a secondary synchronization channel further comprises:
    transmitting a first portion of the second downlink waveform on a first subchannel of the secondary synchronization channel; and transmitting a second portion of the second downlink waveform on a second subchannel of the secondary synchronization channel.

4. The method of claim 3, further comprising:
scrambling the second portion of the second downlink waveform based on the first portion of the second downlink waveform.

5. The method of claim 1, further comprising:
scrambling the second downlink waveform based on the first downlink waveform.

6. The method of claim 1, wherein the primary sequence group includes three of the respective primary sequences and the first downlink waveform encodes the selected one of the respective primary sequences, and wherein the secondary sequence group includes three of the respective secondary sequence subgroups and each of the respective secondary sequence subgroups include one-hundred seventy of the secondary sequences and the second downlink waveform encodes one of the one-hundred seventy of the secondary sequences from a selected one of the respective secondary sequence subgroups.

7. The method of claim 1, wherein the primary sequence group includes three of the respective primary sequences and the secondary sequence group includes three of the respective secondary sequence subgroups, and wherein each of the secondary sequences are only included in one of the respective secondary sequence subgroups.

8. The method of claim 1, wherein the secondary sequence group includes a total of nine-hundred sixty-one of the secondary sequences.

9. A method of operating a wireless communication device, comprising:
receiving first and second downlink waveforms;
decoding a first portion of a cell identification provided in the first downlink waveform, wherein the first portion of the cell identification is based on a selected primary sequence included in a primary sequence group having respective primary sequences, including the selected primary sequence, and wherein the respective primary sequences are each associated with respective secondary sequence subgroups included in a secondary sequence group and each of the respective secondary sequence subgroups include secondary sequences at least some of which are only included in one of the respective secondary sequence subgroups; and
decoding a second portion of a cell identification provided in the second downlink waveform, wherein the second portion of the cell identification is based on a selected one of the secondary sequences selected from one of the respective secondary sequence subgroups associated with the selected primary sequence.

10. The method of claim 9, wherein the receiving first and second downlink waveforms further comprises:
receiving the first downlink waveform on a primary synchronization channel of a downlink signal; and
receiving the second downlink waveform on a secondary synchronization channel of the downlink signal.

11. The method of claim 10, wherein the receiving the second downlink waveform on a secondary synchronization channel of the downlink signal further comprises:
receiving a first portion of the second downlink waveform on a first subchannel of the secondary synchronization channel; and
receiving a second portion of the second downlink waveform on a second subchannel of the secondary synchronization channel.

12. The method of claim 11, further comprising:
descrambling the second portion of the second downlink waveform based on the first portion of the second downlink waveform.

13. The method of claim 9, further comprising:
descrambling the second downlink waveform based on the first downlink waveform.

14. The method of claim 9, wherein the primary sequence group includes three of the respective primary sequences and the first downlink waveform encodes the selected one of the respective primary sequences, and wherein the secondary sequence group includes three of the respective secondary sequence subgroups and each of the respective secondary sequence subgroups include one-hundred seventy of the secondary sequences and the second downlink waveform encodes one of the one-hundred seventy of the secondary sequences from a selected one of the respective secondary sequence subgroups.

15. The method of claim 9, wherein the primary sequence group includes three of the respective primary sequences and the secondary sequence group includes three of the respective secondary sequence subgroups, and wherein each of the secondary sequences are only included in one of the respective secondary sequence subgroups.

16. The method of claim 9, wherein the secondary sequence group includes a total of nine-hundred sixty-one of the secondary sequences.

17. A wireless communication device, comprising:
a receiver configured to receive first and second downlink waveforms; and
a processor coupled to receiver, wherein the processor is configured to:
decode a first portion of a cell identification provided in the first downlink waveform, wherein the first portion of the cell identification is based on a selected primary sequence included in a primary sequence group having respective primary sequences, including the selected primary sequence, and wherein the respective primary sequences are each associated with respective secondary sequence subgroups included in a secondary sequence group and each of the respective secondary sequence subgroups include secondary sequences at least some of which are only included in one of the respective secondary sequence subgroups; and
decode a second portion of a cell identification provided in the second downlink waveform, wherein the second portion of the cell identification is based on a selected one of the secondary sequences selected from one of the respective secondary sequence subgroups associated with the selected primary sequence.

18. The wireless communication device of claim 17, wherein the receiver is further configured to:
receive the first downlink waveform on a primary synchronization channel of a downlink signal; and
receive the second downlink waveform on a secondary synchronization channel of the downlink signal.

19. The wireless communication device of claim 18, wherein the receiver is further configured to:
receive a first portion of the second downlink waveform on a first subchannel of the secondary synchronization channel; and receive a second portion of the second downlink waveform on a second subchannel of the secondary synchronization channel.

20. The wireless communication device of claim 19, wherein the processor is further configured to:

descramble the second portion of the second downlink waveform based on the first portion of the second downlink waveform.

* * * * *